United States Patent
Haubrich et al.

(10) Patent No.: US 7,780,153 B2
(45) Date of Patent: Aug. 24, 2010

(54) CONNECTING BEARING

(75) Inventors: Thomas Haubrich, Goedenroth (DE); Thomas Klein, Wehr (DE)

(73) Assignee: BOMAG GmbH, Boppard (DE)

( * ) Notice: Subject to any disclaimer, the term of this patent is extended or adjusted under 35 U.S.C. 154(b) by 24 days.

(21) Appl. No.: 11/168,294

(22) Filed: Jun. 29, 2005

(65) Prior Publication Data

US 2006/0001203 A1    Jan. 5, 2006

(30) Foreign Application Priority Data

Jul. 2, 2004    (DE) .................. 20 2004 010 409 U

(51) Int. Cl.
F16F 13/00 (2006.01)

(52) U.S. Cl. .................. 267/140.13; 267/141; 267/153; 267/292

(58) Field of Classification Search .............. 267/292, 267/293, 294, 136, 139, 140.11, 140.13, 267/141.1, 141.3, 141.4, 141.5, 153, 141.2, 267/141.7

See application file for complete search history.

(56) References Cited

U.S. PATENT DOCUMENTS

| | | | | |
|---|---|---|---|---|
| 2,273,869 A | * | 2/1942 | Julien | 267/153 |
| 2,781,990 A | * | 2/1957 | Via | 267/141.7 |
| 2,830,780 A | * | 4/1958 | Schloss | 267/141.4 |
| 2,865,586 A | * | 12/1958 | Paulsen | 267/141.4 |
| 2,869,811 A | * | 1/1959 | Boschi | 267/141.4 |
| 3,304,043 A | * | 2/1967 | Beck | 267/140.5 |
| 3,350,042 A | * | 10/1967 | Stewart et al. | 267/141.4 |
| 3,756,551 A | * | 9/1973 | Bishop | 267/141.1 |
| 4,391,436 A | * | 7/1983 | Fishbaugh | 267/141.1 |
| 4,522,378 A | * | 6/1985 | Nelson | 267/141.4 |
| 4,610,438 A | * | 9/1986 | Eberhard et al. | 267/220 |
| 4,623,135 A | * | 11/1986 | Ray | 267/140.13 |
| 5,190,269 A | * | 3/1993 | Ikeda et al. | 267/140.12 |
| 5,743,509 A | * | 4/1998 | Kanda et al. | 248/635 |
| 5,829,730 A | * | 11/1998 | Ott | 248/635 |
| 5,876,023 A | * | 3/1999 | Hain et al. | 267/141.4 |
| 6,394,434 B2 | * | 5/2002 | Wolf et al. | 267/141 |
| 6,802,498 B2 | * | 10/2004 | Makino et al. | 267/140.13 |
| 2002/0038928 A1 | * | 4/2002 | Rice et al. | 267/153 |
| 2003/0111780 A1 | * | 6/2003 | Ogawa et al. | 267/140.12 |
| 2006/0202400 A1 | * | 9/2006 | Fitzgerald | 267/293 |

* cited by examiner

Primary Examiner—Thomas J Williams
(74) Attorney, Agent, or Firm—Baker & Hostetler, LLP

(57) ABSTRACT

A connecting bearing for elastic connection between at least two elements. The connecting bearing includes a first fastening device and a second fastening device. The first fastening device and second fastening device are each mechanically coupled by a elastomer means. The elastomer means is constructed and used as a vibration insulator.

13 Claims, 2 Drawing Sheets

CONNECTING BEARING

CROSS REFERENCE TO RELATED APPLICATIONS

This application claims priority to German Patent Application Serial No. 202004010409.1, filed Jul. 2, 2004 entitled, BEARING, the disclosure of which is incorporated by reference in its entirety.

FIELD OF THE INVENTION

The invention relates to a connecting bearing for elastic connection of at least two elements, whereby the connecting bearing contains a first and a second fastening device, whereby the fastening devices are coupled mechanically by means of an elastomer, which is constructed as a vibration insulation.

BACKGROUND OF THE INVENTION

A connecting bearing of this type can be used especially as a cabin bearing for insulation of typical machine vibrations generated in working tools, for instance, in the driver's cabin of a vibration roller used in the compaction of soil and traffic surfaces.

The comfort and the driving dynamics of a vehicle are determined decisively by the calibration of the chassis frame. Besides the chassis frame concept, decisive is also the elastic behavior of the rubber support for the bonding of the chassis components, for example, a driver's compartment or a driver's cabin, with the machine frame. An elastomer, such as, for example, rubber, contributes, due to its low construction space requirement, its high extendibility, as well as its low density, to the mechanical uncoupling of the oscillating elements (for example, driver's cabin, motor) with fixed elements (for example, machine frames, motor frames).

Chassis frame bearings are often bush bearings with bonded inner and outer pipes. During the vulcanization, elastomeric tensile stress develops due to the contraction, which is later relieved through the subsequent calibration process for reducing the outer diameter. These bearings are then inserted by press fitting into the bearing eye of the chassis frame component.

Besides the insulation against the vibrations, these so-called rubber-metal bearings also provide excellent acoustic insulation for heavily vibrating elements. Modern, powerful drive concepts and vehicle structures with reduced weight generate novel and stronger excitation of vibrations, which are decoupled in a targeted manner by means of calibration of the dynamic characteristics of the rubber metal bearings. These bearings are modified according to the different areas of the applications and transmit the elastic and dampening forces of the motor suspensions through different tuned elastomer routes and thus decouple the disturbing vibrations before their transmission into the frame or the body.

The elastomer mixtures are developed in part in view of their use in different types of applications, and the elastomer mixtures are used on the basis of all the relevant polymer types and chemicals.

As a free-from-play, elastic and vibration-damping connection between the frame and the driver's cab, the driver's cabin bearings contribute significantly towards optimization of the driving dynamics, driving comfort and preservation of coordination by the driver. In order to prevent the interfering vibrations and the noises in the driver's cab, comfort providing suspensions, which offer highest degree of acoustic insulation, have been developed and used. Rubber-metal elements can be used as freely shaped, compact elements, such as, simple cylindrical rubber blocks, for instance, for insulation of vibrations or as aggregate or connected elements.

In case of aggregated springs, it must be ensured, through adequate pressing in the active areas, that the tension on the elastomer is transmitted uniformly as far as possible and without obstruction of the deformation.

In general, the connecting bearings contain two fastening devices, whereby the fastening devices are coupled mechanically through an elastomer, which is constructed as an insulation against vibration. A frequently used type of connecting bearing is a so-called bushing spring (also called silentbloc), in which two bushings with different diameters are connected by means of vulcanized elastomer. The outer bushing is thereby adapted to fit in a bearing box, for example in a frame, and through the inner bushing, which is built significantly longer than the outer bushing and projects over the inner bushing at both ends, a screw for connecting a heavily vibrating element with the frame is inserted. The vibrations acting on the inner bushing are thus dampened by the radially arranged elastomer and are transmitted only with attenuation to the outer bushing, and thus onto the frame.

Disadvantageous in this connecting bearing is that, it must always be mounted in a box, and hence its constructive flexibility is restricted. Disadvantageous is also that the connecting bearing is not well suited for absorbing mechanical excitations vertical to the longitudinal axis. Disadvantageous is also that in case of a swiveling of the fastened element, it abuts slightly upon the outer bushing or the receiver element for the outer bushing (frame), due to which the mechanical decoupling does not take place, and the vibrations are transmitted forth unhampered. Further, due to the impacts, destruction of the elements and/or frame takes place.

In order to provide more space for the play between the frame and the motor, use of a rubber pad is known, which contains two discs and an elastomer vulcanized between the discs. The first and the second disc each are thereby connected by means of a fastening device, for example a screw, with the frame and the motor. Motor vibrations are thereby dampened by the elastomer arranged between the discs.

Disadvantageous in this is that under mechanical excitations that occur vertically with respect to the longitudinal axis, and in particular, under tensile stress, at least one disc can get loosened from the elastomer. In order to remedy for this disadvantage, design of the respective ends of the rubber pad with threaded rods is known, in which one end of the threaded rod is connected firmly by means of the corresponding fastening device with the elastomer (for example, through vulcanization). Disadvantageous in this is that the free construction space for the insertion of the rubber pad is restricted due to the threaded rods. Further, this rubber pad can be built in with difficulty and is thus time consuming, because both the ends of the threaded rods must be tightened by means of nuts on the motor and the frame. Further, due to the elaborate vulcanization process for the bonding of the threaded rods, fabrication of the rubber pads proves to be costly.

Sectional view of the connecting bearings of this kind is shown by way of illustration in FIGS. 3a and 3b.

FIG. 3a shows a bushing spring H, mounted in a frame R, through which a screw S for fastening the motor M is inserted and fastened. Vibrations, which proceed from the motor M, are thus transmitted forth onto the screw S, where they are dampened by the elastomer E between the inner bushing and the outer bushing and are transmitted further only with attenuation onto the frame. Disadvantageous in this is that the motor M can hit the frame R even due to a swivel within a small angular region, which can lead to damages.

FIG. 3b shows a rubber padding G, known in the state-of-the-art, which can also be resorted to as a connecting element between the motor M and the frame R, whereby the vibrations of the motor M are dampened by the elastomer E contained in the rubber pad and are thus transmitted, with attenuation, onto the frame R. At the respective ends of the rubber pad G, the plates T1, T2 are mounted, on which the respective threaded rods are attached. With these threaded rods are connected on the other hand the frame R and the motor M respectively. Since the plates can easily get loosened from the rubber pad under tensile stress, the threaded rods are fastened by means of fastening devices (not shown) into the elastomer. Disadvantageous thereby is that, due to the special design of the threaded rods, the possible room for the montage is restricted. Besides that, the montage is difficult and time consuming.

SUMMARY OF THE INVENTION

The underlying problem of the invention was to develop a connecting bearing of the kind mentioned at the outset, to such an extent, that the connecting bearing can be assembled fast and easily, it can insulate the vertical and the horizontal excitations well and can be conveniently fabricated.

This problem is solved through the connecting bearing according to the patent.

An important idea of the invention lies in that a first attachment device is constructed as a receiver bushing, which runs centrally along the longitudinal direction through the elastomer, and a second fastening device is built as a clamping collar, which is arranged essentially vertically to the receiver bushing, whereby a first internal area of the clamping collar is arranged in the elastomer, and an outer area of the clamping collar projects outside the elastomer.

With this design of the connecting bearing, first of all, it can be attached fast and easily to a frame by inserting a screw through the receiver bushing and fastening the frame at the other end. For that purpose, for example, a corresponding screw can be provided in the frame. Thus, the lower end of the connecting bearing, that is, the elastomer, rests on the frame. The clamping collar is mechanically coupled with the frame through the elastomer and can serve now as a fastening device for the motor. With this design, good insulation of horizontal accelerations, or external disturbing vibrations, both in the direction and transversal to the direction of the travel, can be ensured. Thus the elastic constant parameters of the connecting bearing in the longitudinal direction can, for instance, be two to four times as high as the elastic constant values vertically to the longitudinal direction (for example, 585 N/mm$^2$ to 175 N/mm$^2$). A further advantage lies in that the cabin extraction forces (ROPS test according to DIN ISO 3471) that arise are transmitted through the screw.

Preferably, at the upper end of the elastomer, a disc is mounted, whose outer diameter corresponds essentially to the outer diameter of the elastomer, and whose inner diameter essentially corresponds to the outer diameter of the upper end of the connecting bearing. With this embodiment, the elastomer is uniformly pre-stressed after bracing the fastening screws tight, so that a more uniform and better insulation against vibrations is provided. The disc and the receiver bushing can thereby be built in such a manner that the disc is engaged with the receiver bushing in the mounted state of the connecting bearing. Alternatively, the disc and the receiver bushing can be built as a single component.

Preferably, the disc and the clamping collar are built in such a fashion that the disc can be reinforced at the clamping collar in case of load. For that, it makes sense that the outer diameter of the disc is greater than the bore diameter of the clamping collar. With that, the cabin extraction forces can be transmitted through the disc, which is clamped against the receiver bushing, and is reinforced by the clamping collar in case of load.

Preferably, in the lower area of the elastomer, a radial recess is provided, which runs essentially parallel to the receiver bushing, that is, in the longitudinal direction, and runs up to a pre-specified height of the connecting bearing. Advantageous in this embodiment is that the recess separates the elastic constant in the vertical direction from the elastic constant in the horizontal direction and hence the elastic constants can be influenced independently of each other. The easy swiveling up to this range also enables the justification of the clamping collar with ease, due to which it becomes easier to connect the element to be fastened, for example the motor, which is slightly displaced from its original fastening position, with the clamping collar. With this tolerance range, a quick and easy fastening of the motor with the clamping collar is facilitated.

Thereby, it is of advantage if the radial recess runs adjacent to the receiver bushing. The embodiment of the radial recess can vary, so that with the growing recess, the tolerance range also grows. This tolerance range increases with the height, with which the radial recess is provided in the elastomer. This height must, however, lie below the total height of the connecting bearing.

Preferably, the receiver bushing has a conical form in the upper region. This embodiment serves as an aid during the assembly.

Preferably, the clamping collar is built with essentially a rectangular form, and has an inner bore. This inner bore is thereby built in such a fashion that its diameter is greater than the diameter of the receiver bushing, so that adequate elastomer is present between the clamping collar and the receiver bushing. In a further embodiment, in the outer area of the clamping collar, fastening holes are provided. It is thereby of advantage to provide these fastening holes in the edge area of the clamping collar. The screws for fastening the motor can be inserted through these fastening holes.

It is of advantage, if the elastomer is built with a bead-shaped form, preferably in the area of the clamping collar and/or in the lower area. With this embodiment, the clamping collar is engaged firmly with the elastomer, so that a firm connection is ensured.

BRIEF DESCRIPTION OF THE DRAWINGS

In the following, the preferred forms of the embodiment according to the invention are described in greater detail on the basis of the drawings. Thereby, shown schematically are.

DETAILED DESCRIPTION

Figure 1A:
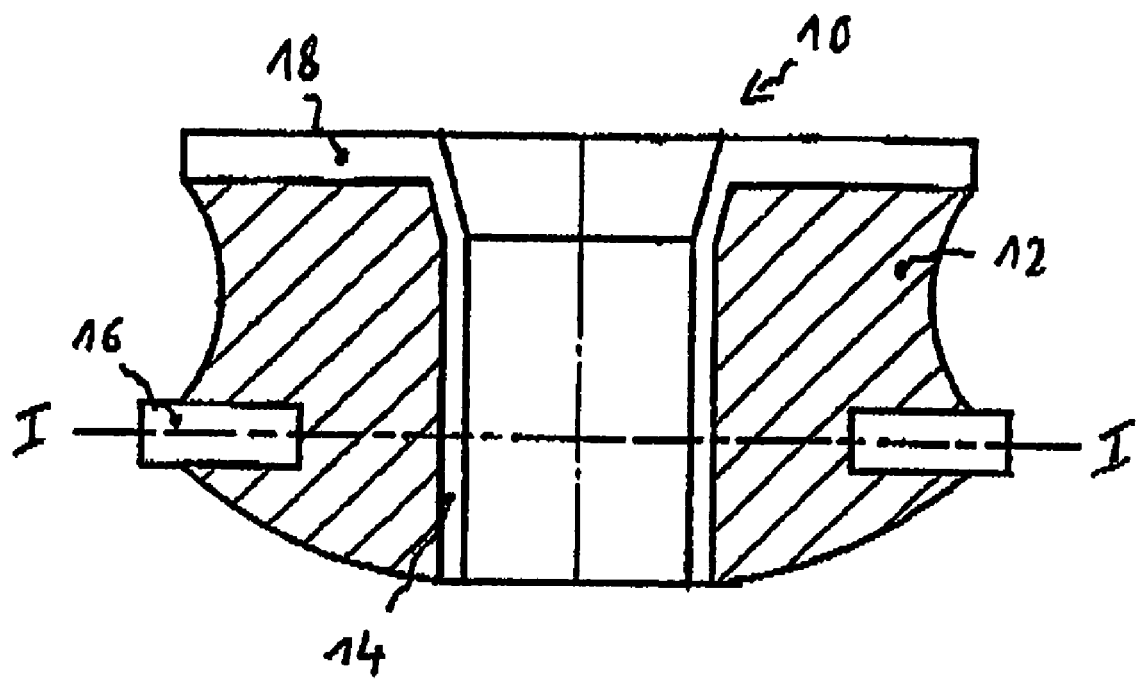
FIG. 1a A sectional view in longitudinal direction of a connecting bearing.
Figure 1B:
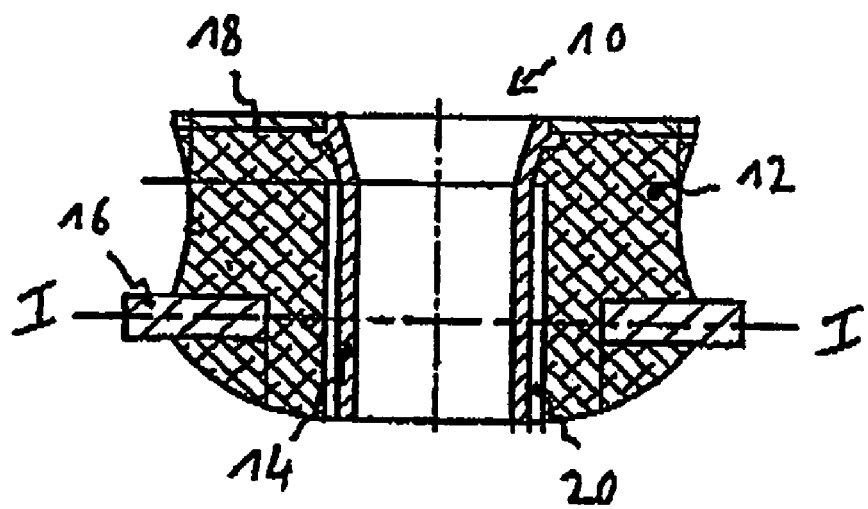
FIG. 1b A sectional view in longitudinal direction of a connecting bearing in an another embodiment FIG. 2 A sectional view along the sectional lines I-I of the connecting bearing according to FIGS. 1a and 1b.

FIGS. 1a and 1b show respectively a connecting bearing 10 for fastening of the driver's cabin to the frame in a vibration roller (not shown). The connecting bearing 10 contains an elastomer 12, through which a receiver bushing 14 runs centrally in the longitudinal direction. In the outer area of the elastomer 12, a clamping collar 16 is arranged, which is connected firmly with the elastomer 12. At the upper end of the elastomer 12 is a disc 18, which is firmly engaged with the receiver bushing 14 on pressing the connecting bearing 10.

In the connecting bearing shown in FIG. 1a, the disc 18 and the receiver bushing 14 are built as a single component.

In the connecting bearing 10 shown in FIG. 1b, the disc 18 and the receiver bushing 14 are built in such a fashion that in the clamped state of the connecting bearing 10, the disc 18 is engaged with the receiver bushing 14. In the lower region of the elastomer 12 is a ring-cylindrical recess 20, which runs essentially parallel to the receiver bushing 14. In the clamped state, this radial recess 20 enables easy swiveling of the connecting bearing 10 in the longitudinal direction. Thus, an element to be attached can be attached fast and easily with the clamping collar. In the connecting bearings 10 shown in FIGS. 1a and 1b, in each case the elastomer is built in with convex bead-like shape in the area of the clamping collar 16. The elastomer in the lower area of the connecting bearing 10 is also built with a bead-like convex shape.

Figure 2:
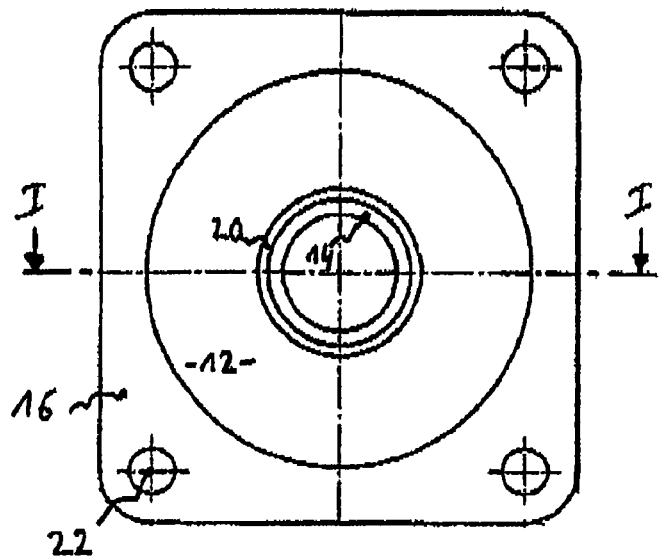
Figure 3A:
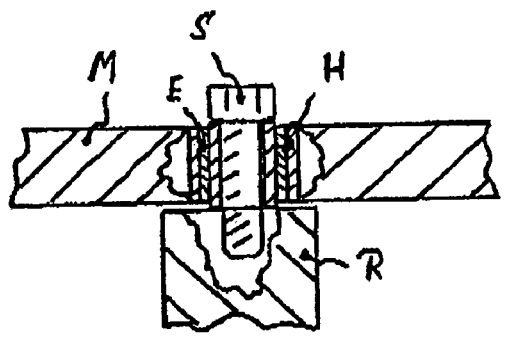
FIGS. 3a and 3b depict sectional views of known connecting bearings.
Figure 3B:
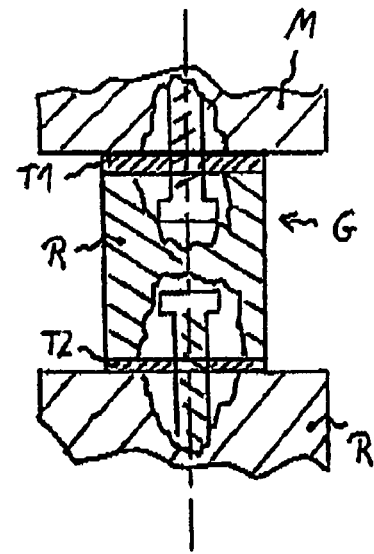

FIG. 2 shows a side view of the connecting bearing 10 along the sectional lines I-I. The clamping collar has a rectangular form and contains an attachment hole 22 in its edge area. In this sectional view, one can recognize the receiver bushing 14 running radially outward, the recess 20 connected to it, and the elastomer 12 connected to it.

What is claimed is:

1. Connecting bearing for elastic connection of at least two elements, whereby the connecting bearing comprises a first and a second fastening device, whereby the fastening devices are coupled mechanically through an elastomer, which is constructed as a vibration insulator, whereby the first fastening device is built as a receiver bushing, which runs centrally in longitudinal direction through the elastomer, wherein the receiver bushing includes a lower generally straight region and an upper conical region, and whereby the second fastening device is built as a clamping collar which is arranged essentially vertically with respect to the receiver bushing, whereby an inner area of the clamping collar comprising an inner bore is arranged in the elastomer, and an outer area of the clamping collar projects outside the elastomer, wherein the lower area of the elastomer which is arranged below the clamping collar has an entirely convex-shaped outer periphery, and a radial recess, with a circular ring shaped cross-section, is provided, which extends from the lower convex-shaped area of the elastomer generally parallel and directly proximate to the straight region of the receiver bushing and reaches up to the conical region of the receiver bushing, wherein a disc is mounted at the upper end of the elastomer and an outer radial periphery of the elastomer is entirely concave-shaped between the disc and the clamping collar and the radial recess extends also through the concave-shaped section of the elastomer.

2. Connecting bearing according to claim 1, wherein at the upper end of the elastomer, a disc is mounted, the outer diameter of which corresponds essentially to the outer diameter of the elastomer and the inner diameter of which essentially corresponds to the outer diameter of the receiver bushing at the upper end of the connecting bearing.

3. Connecting bearing according to claim 2, wherein the disc and the receiver bushing are built in such a fashion, that, in the clamped state of the connecting bearing, the disc stands in engagement with the receiver bushing.

4. Connecting bearing according to claim 2, wherein the disc and the receiver bushing are built as a single component.

5. Connecting bearing according to claim 2 wherein the disc and the clamping collar are built in such a fashion that the disc can be reinforced at the clamping collar in case of load.

6. Connecting bearing according to claim 5, wherein the outer diameter of the disc is greater than the bore diameter of the clamping collar.

7. Connecting bearing according to claim 1, wherein the clamping collar is built with essentially a rectangular form and comprises the inner bore.

8. Connecting bearing according to claim 1, wherein fastening holes are provided in the outer area of the clamping collar.

9. Connecting bearing according to claim 1, wherein the total height of the radial recess is below the total height of the connecting bearing.

10. Connecting bearing according to claim 1, wherein the radial recess is cylindrical shaped over its total height.

11. Connecting bearing according to claim 1, wherein the elastomer is arranged without an outer cage.

12. Connecting bearing according to claim 1, wherein the clamping collar is planar formed.

13. Connecting bearing according to claim 1, wherein the inner bore of the clamping collar is greater than the outer diameter of the receiver bushing, so that adequate elastomer is present between the clamping collar and the receiver bushing.

* * * * *